(12) United States Patent
Wise

(10) Patent No.: US 12,025,854 B1
(45) Date of Patent: Jul. 2, 2024

(54) EYEWEAR WITH CIRCUMAMBIENT ILLUMINATION

(71) Applicant: Matthew Wise, Pasadena, CA (US)

(72) Inventor: Matthew Wise, Pasadena, CA (US)

(73) Assignee: CIE TECHNOLOGIES LLC, Pasadena, CA (US)

( * ) Notice: Subject to any disclaimer, the term of this patent is extended or adjusted under 35 U.S.C. 154(b) by 0 days.

(21) Appl. No.: 18/087,655

(22) Filed: Dec. 22, 2022

(51) Int. Cl.
*G02C 11/04* (2006.01)

(52) U.S. Cl.
CPC .................................. *G02C 11/04* (2013.01)

(58) Field of Classification Search
CPC ...................................................... G02C 11/04
See application file for complete search history.

(56) References Cited

U.S. PATENT DOCUMENTS

| | | | | |
|---|---|---|---|---|
| 4,254,451 A | * | 3/1981 | Cochran, Jr. ...... | A44C 15/0015 345/82 |
| 9,322,535 B1 | * | 4/2016 | Al Rasheed ........... | G02C 11/04 |
| 10,391,312 B2 | * | 8/2019 | Mowery ............... | A61N 1/0476 |
| 2007/0200998 A1 | * | 8/2007 | Schrimmer ........... | G02C 11/04 351/158 |
| 2020/0124877 A1 | * | 4/2020 | Hsu ..................... | F21V 33/0004 |

FOREIGN PATENT DOCUMENTS

| CN | 104678580 A | * | 6/2015 | |
|---|---|---|---|---|
| CN | 107202313 A | * | 9/2017 | |
| GB | 2070221 A | * | 9/1981 | ............. A42B 3/044 |

OTHER PUBLICATIONS

Machine translation of CN-104678580-A (Year: 2015).*
Machine translation of CN-107202313-A (Year: 2017).*

* cited by examiner

*Primary Examiner* — Leah Simone Macchiarolo
(74) *Attorney, Agent, or Firm* — YOUNG LAW FIRM, P.C.

(57) ABSTRACT

Circumambient illumination eyewear has a frame that includes a bridge which extends between temple ends across a midsection, and stems. A pair of lenses are mounted on the frame such that each lens covering an eye-space that is positioned over the user's eyes when the user is wearing the eyewear. At least one illumination strip is disposed around each of the pair of lenses so that the at least one illumination strip extends entirely around each of the pair of lenses, and emits at least 50 lumens into the workspace. A battery is operably connected to the illumination strip via a dimmer switch.

9 Claims, 4 Drawing Sheets

EYEWEAR WITH CIRCUMAMBIENT ILLUMINATION

BACKGROUND OF THE INVENTION

Field of the Invention

This invention relates generally to eyewear, and more particularly to eyewear that includes lighting disposed entirely around each eye to provide circumambient illumination for the user while they are wearing the eyewear.

Description of Related Art

The prior art teaches two types of eyewear: 1) functional eyewear that provides high-lumen illumination of a workspace for a user wearing the eyewear, to provide superior visibility in the workspace, and 2) decorative eyewear that includes low-lumen lighting of the eyewear itself for decorative and entertainment purposes.

The first type of functional, high-lumen eyewear has high powered lights, but there are usually only one or two of the high powered lights, and they are typically only positioned at the temples of the eyewear, and/or at the midsection of the bridge of the eyewear. An example of this is shown in Pastore Jr., U.S. 2022/0334411, which teaches functional glasses for illuminating a dimly lit workspace. This eyewear includes three high powered lights mounted on the frame, one at each of the temples and one in the center of the bridge of the glasses.

Castañeda, U.S. 2022/0244575, teaches a similar form of eyewear having a pair of light emitting diodes (LEDs) on the frame of the glasses at the temples. While the lights provided on these glasses are strong enough for lighting a workspace, we have found that in practice the physical positioning of the lights can create shadows which may impede work. There is a need in the art for eyewear that provides strong circumambient illumination that does not form any shadows in the workspace.

Other references teach eyewear with circumambient illumination; however, these are exclusively for the purposes of entertainment, so the light sources used are not strong enough for providing adequate illumination of the workspace. An example of this is shown in Feldman, U.S. Pat. No. 5,946,071, which teaches eyewear having a frame that includes an elongated flexible electroluminescent wire extending along a perimeter extent of the frame. A self-contained voltage source is also carried by the eyeglass frame, together with a manually operable switch. When the switch is turned on, a low-lumen electroluminescent light is emitted along the entire perimeter extent of the frame.

While the Feldman eyeglasses include an illuminated wire that extends entirely around the eye, the electroluminescent wire is a low power lighting that is intended for an "intriguing entertainment effect." Feldman does not teach the use of high powered LEDs that extend entirely around each of the user's eyes.

Cochran, Jr., U.S. Pat. No. 4,254,451, teaches similar eyewear that includes LEDs around the frame to surround the user's eyes. The LED's are arranged in an electrical circuit which allows them to be addressed in X-Y matrix fashion. The first decoder sequentially addresses each "row" of LED's while the second decoder sequentially addresses each "column" of LED's in the matrix so that each LED in the matrix circuit is sequentially flashed. After the entire array of LED's has been sequentially actuated a predetermined number of times, the up-down counter is electronically switched to the opposite state so as to reverse the order in which the LED's are sequentially actuated. As with Feldman, these lights are provided for entertainment value, not for serious high-powered illumination of a work area for a user wearing the eyewear.

The prior art teaches eyewear with strong illumination in the form of LEDs mounted at the bridge of the eyewear, which unfortunately does not provide circumambient illumination. The prior art also teaches eyewear that provided very low power and decorative circumambient illumination, for entertainment purposes. However, the prior art does not teach eyewear that provides strong LEDs completely around each of the user's eyes, to provide circumambient illumination that is strong enough to illuminate a workspace without forming shadows in the workspace. The present invention fulfills these needs and provides further advantages as described in the following summary.

SUMMARY OF THE INVENTION

The present invention teaches certain benefits in construction and use which give rise to the objectives described below.

The present invention provides circumambient illumination eyewear adapted to be worn over the eyes and nose of a user for illumination of a workspace. The circumambient illumination eyewear includes a frame sized and shaped to be mounted over the eyes of the user, the frame having a bridge which extends between temple ends across a midsection that is positioned above the user's nose. The eyewear includes a means for mounting the frame over the user's eyes, and a pair of lenses mounted on the frame such that each lens covering an eye-space that is positioned over the user's eyes when the user is wearing the eyewear. The pair of lenses each have an upper edge that is mounted to the bridge of the frame, an outer side edge that extends downwardly form the temple end, an inner side edge that extends downwardly from the midsection, the outer side edges and the inner side edges being connected by a bottom edge. At least one illumination strip is disposed around each of the pair of lenses so that the at least one illumination strip extends entirely around each of the pair of lenses, along the upper edge, the outer side edge, the bottom edge, and the inner side edge. The at least one illumination strip emits, collectively, at least 50 lumens into the workspace. A battery is operably connected to the at least one illumination strip via a switch, in one embodiment a dimmer switch.

A primary objective of the present invention is to provide circumambient illumination eyewear having advantages not taught by the prior art.

Another objective is to provide circumambient illumination eyewear that provides powerful illumination from entirely around each of the user's eyes, so that shadows are eliminated from the workspace.

A further objective is to provide circumambient illumination eyewear that provides at least 50 lumens of illumination onto the workspace, for superior illumination in even the darkest of workspaces.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, circumambient illumination eyewear adapted to be worn by a user for illumination of a workspace. The circumambient illumination eyewear provides high lumen illumination from sources disposed to completely surround each eye of the user, for shadow-free illumination of the workspace.

Figure 1:
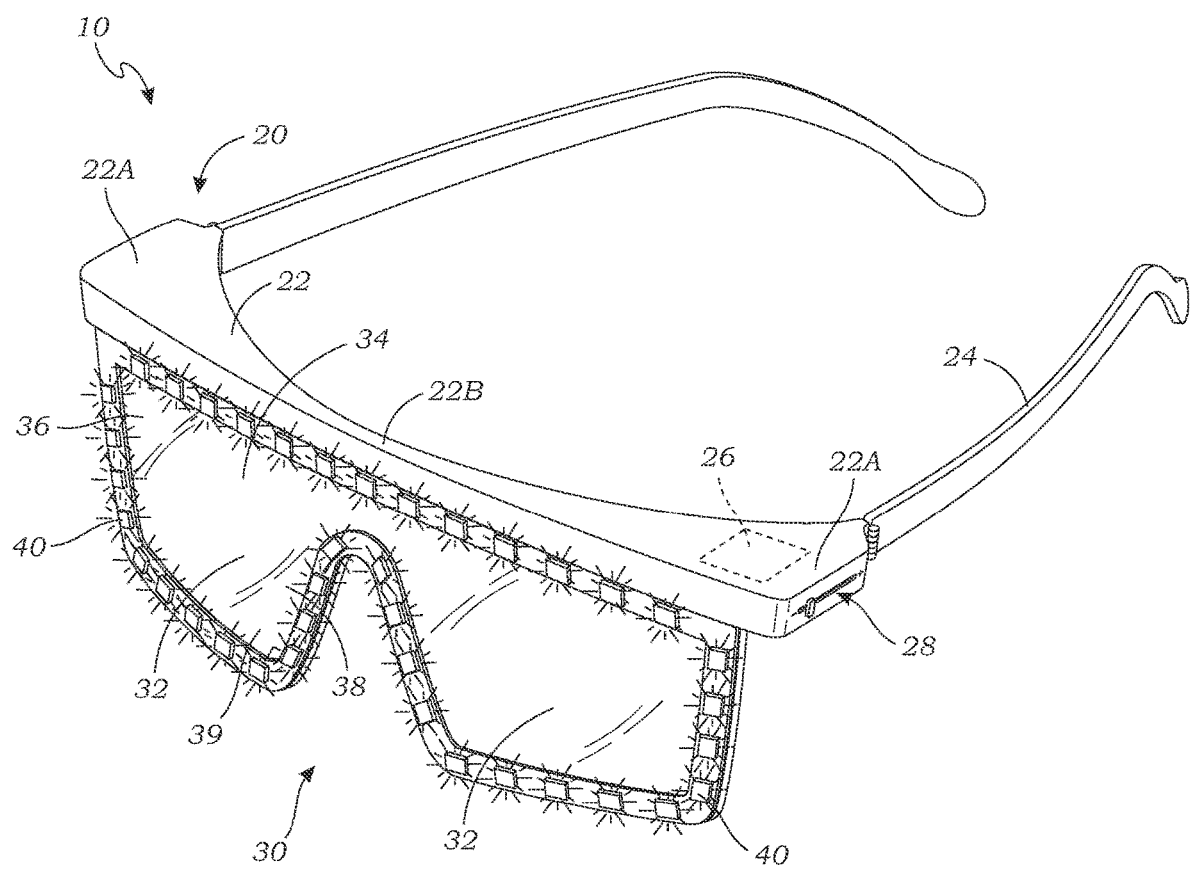
FIG. 1 is a perspective view of a circumambient illumination eyewear according to one embodiment of the present invention.
Figure 2:
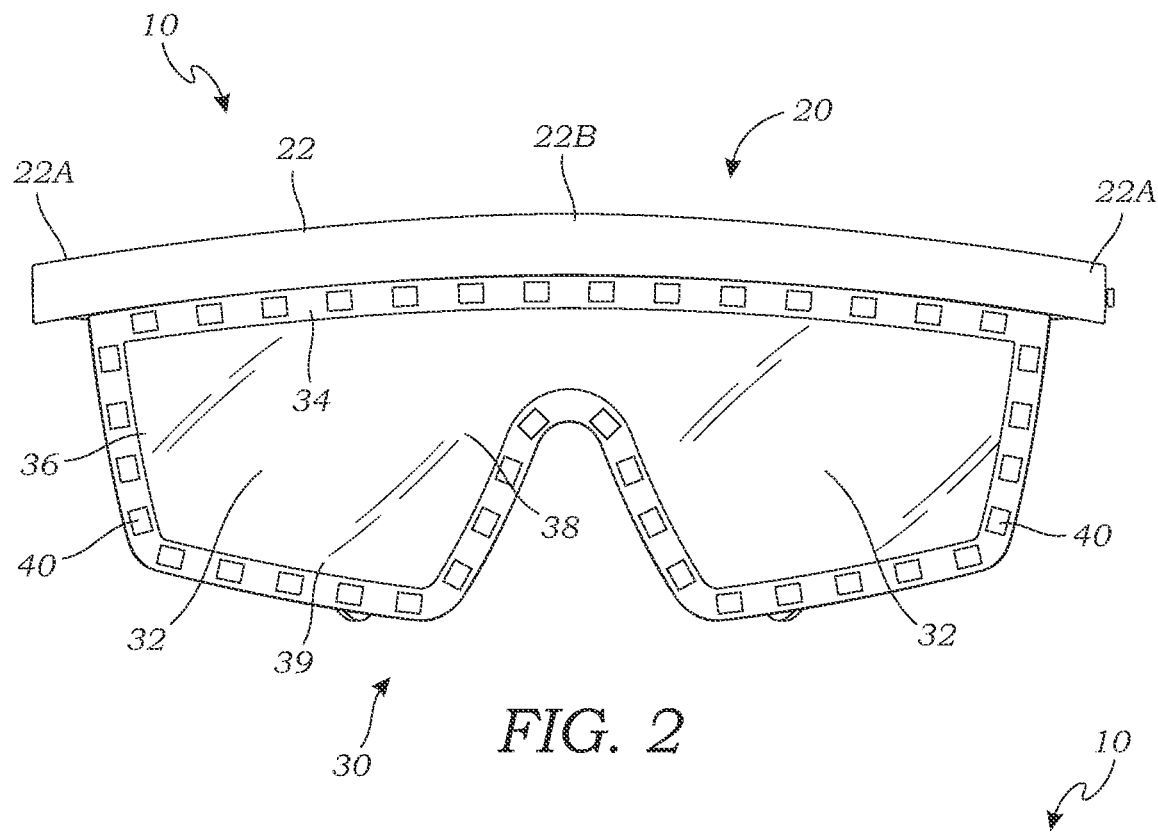
FIG. 2 is a front plan view thereof.
Figure 3:
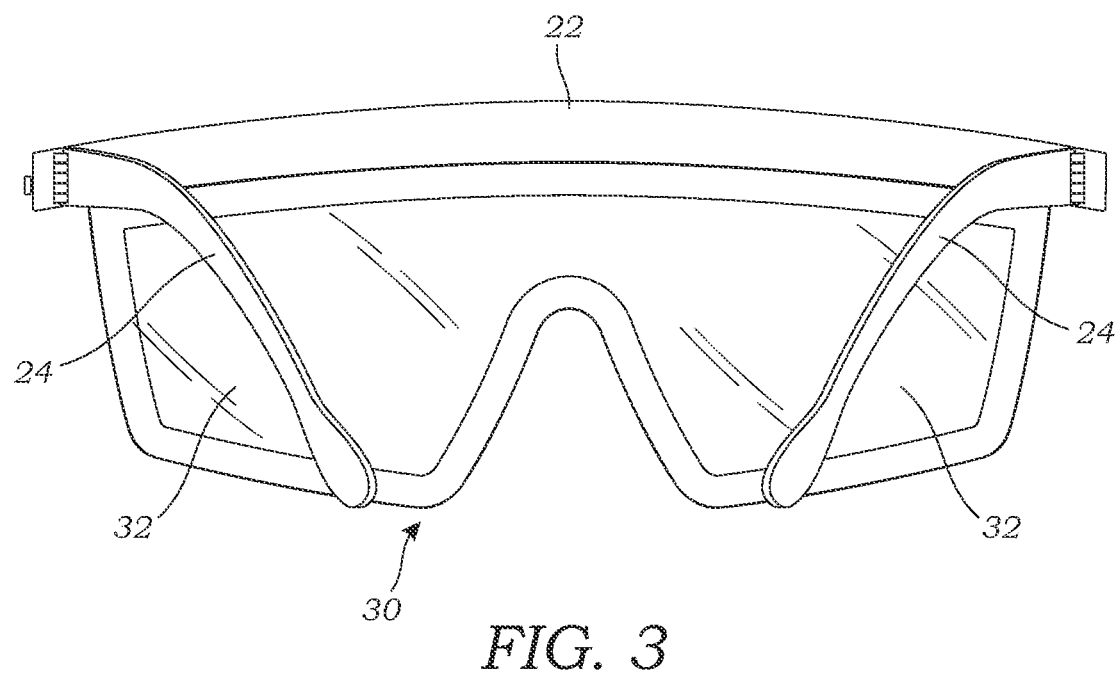
FIG. 3 is a rear plan view thereof.
Figure 4:
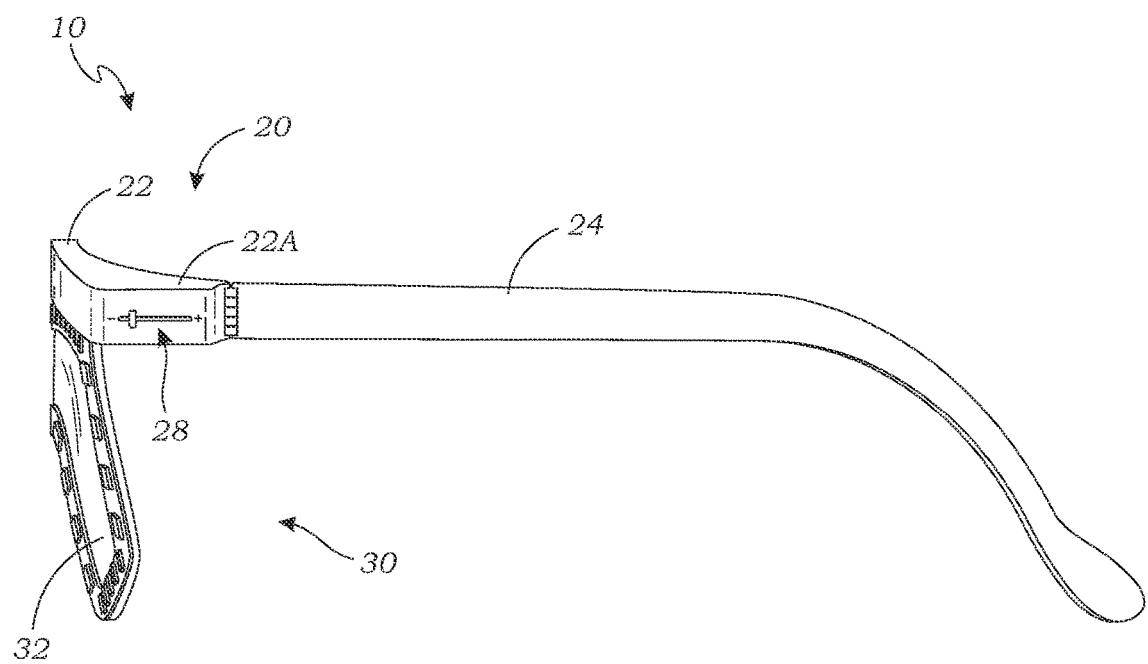
FIG. 4 is a side elevation view thereof.

FIG. 1 is a perspective view of a circumambient illumination eyewear 10 according to one embodiment of the present invention. FIG. 2 is a front plan view thereof; FIG. 3 is a rear plan view thereof; and FIG. 4 is a side elevation view thereof. As shown in FIGS. 1-4, the circumambient illumination eyewear 10 includes a frame 20 sized and shaped to be mounted over the eyes of the user. In the present embodiment, the frame 20 includes a bridge 22 which extends between temple ends 22A, across a midsection 22B that is positioned above the user's nose.

The eyewear 10 further includes a means for mounting the frame 20 over the user's face. In this embodiment, the means for mounting is in the form of stems 24 that are pivotally mounted on the temple ends 22A of the frame; however, in alternative embodiments, the means for mounting may be in the form of a flexible strap 25 (shown in FIG. 6) that wraps around the user's head, or any other structure known in the art for mounting eyewear onto the user's face. Such alternative embodiments should be considered within the scope of the present invention.

An eye covering portion 30 is mounted on the frame 20. The eye covering portion 30 includes a pair of lenses 32 are mounted on the frame in a manner known in the art, each lens covering a eye-space over one of the user's eyes when the user is wearing the eyewear 10. The term "pair of lenses" is defined to broadly include any construction that has regions that cover each of the user's eyes, whether it is formed of a single piece (as illustrated), or of two or more physically separated pieces. Also, the term "pair of lenses" includes any form of transparent material having two opposed surfaces that covers the user's eyes, whether or not any of these opposed surfaces are curved or not. It is not required that these elements be curved in a manner that directs light rays in any manner. The pair of lenses may have curvatures for directing light, they may be tinted or otherwise coated, and/or have any other treatments known in the art.

The pair of lenses 32 each have an upper edge 34 that is mounted to the bridge 22 of the frame 20, an outer side edge 36 that extends downwardly form the temple end 22A, an inner side edge 38 that extends downwardly from the midsection 22B, the outer side edges 36 and the inner side edges 38 being connected by a bottom edge 39.

As best shown in FIGS. 1-2, at least one illumination strip 40 is disposed around each of the pair of lenses 32 so that the at least one illumination strip 40 extends entirely around each of the pair of lenses 32, along the upper edge 34, the outer side edge 36, the bottom edge 39, and the inner side edge 38. The at least one illumination strip 40 may form an annular structure that uniformly surrounds each of the pair of lenses 32; or it may, as shown in FIGS. 1-2, have small breaks in the lighting, so long as the majority (at least 50%) of each of the sides is covered. It is preferred that uniform coverage be provided along all sides as far as practicable, but it is expected that some variance may be required due to limitations in the structure of the eyewear.

Figure 6:
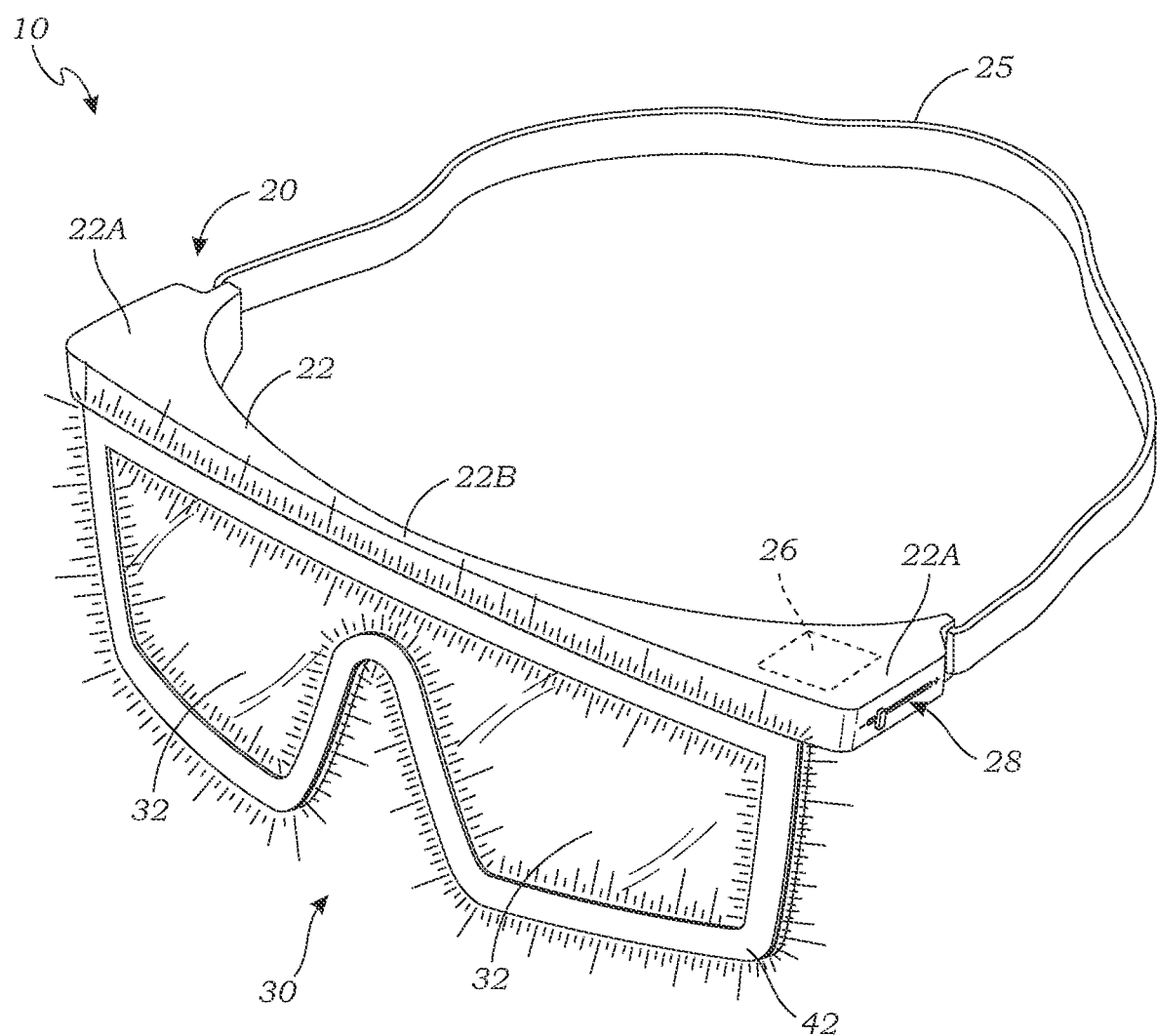
FIG. 6 is a perspective view of a second embodiment of the circumambient illumination eyewear.

In the embodiment of FIGS. 1-2, the at least one illumination strip 40 includes one or more LED strips; however, in other embodiments, such as shown in FIG. 6, other forms of illumination mechanisms may be used, such as an illumination cord 42 (shown in FIG. 6), and/or any other illumination structures known in the art. The at least one illumination strip 40 must, however, be high intensity lighting that puts forth, collectively, at least 50 lumens onto the workspace. This is significantly stronger than decorative lighting, which tends to be 1-30 lumens. In one embodiment, the at least one illumination strip 40 collectively has at least 100 lumen output, and the stronger systems may have about 500 lumen output.

The at least one illumination strip 40 may include a backing that directs light in a forward direction, a diffuser (not shown) for properly diffusing the light, and/or a lens or lenses over each LED for directing the light emitted in a desired direction. Since the light is coming from every direction around the eye of the user, no shadows of any significance will be able to form in the workspace, thereby facilitating work being performed in the workspace.

Figure 5:
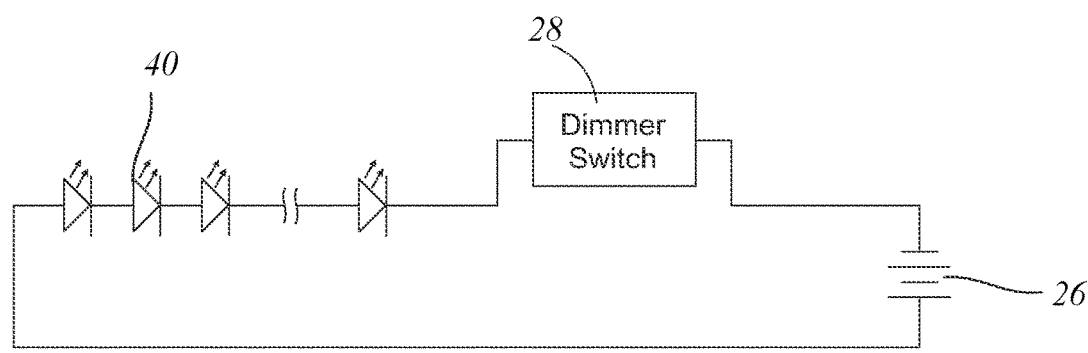
FIG. 5 is a schematic of one embodiment of electronics used in the circumambient illumination eyewear of FIG. 1.

FIG. 5 is a schematic of one embodiment of electronics used in the circumambient illumination eyewear of FIG. 1. As shown in FIGS. 1 and 5, the at least one illumination strip 40 may be connected to a battery 26 through a switch 28 (in this case a dimmer switch). In this embodiment, the battery 26 is mounted in the frame 20 at one (or both) of the temple ends 22A. However, other locations may also be used. For example, the battery 26 may be mounted on the stem 24 or stems, or it may be mounted on a structure that surrounds the user's head, and electronically connected to the at least one illumination strip 40. The dimmer switch 28 enables the intensity of the illumination to be adjusted.

FIG. 6 is a perspective view of a second embodiment of the circumambient illumination eyewear. As noted above, FIG. 6 illustrates the illuminated cord 42 that surrounds each of the user's eyes, and the frame 20 is held in place with a flexible strap 25 (rather than rigid stems). While two embodiments of the eyewear are illustrated, those skilled in the art may adapt the teachings of this invention to any known eyewear structure known in the art, and such alternative constructions should be considered within the scope of the present invention.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. Circumambient illumination eyewear adapted to be worn over the eyes and nose of a user for illumination of a workspace, the circumambient illumination eyewear comprising:
    a frame sized and shaped to be mounted over the eyes of the user, the frame having a bridge which extends between temple ends across a midsection that is positioned above the user's nose;
    a means for mounting the frame over the user's eyes;
    a pair of lenses mounted on the frame such that each lens covering an eye-space that is positioned over the user's eyes when the user is wearing the eyewear, the pair of lenses each have an upper edge that is mounted to the bridge of the frame, an outer side edge that extends downwardly form the temple end, an inner side edge that extends downwardly from the midsection, the outer side edges and the inner side edges being connected by a bottom edge;
    at least one illumination strip disposed around each of the pair of lenses so that the at least one illumination strip extends entirely around each of the pair of lenses, along the upper edge, the outer side edge, the bottom edge, and the inner side edge;
    wherein the at least one illumination strip includes high intensity lighting, in the form of illumination cord or a plurality of LEDs, with sufficient power to emit, collectively, at least 50 lumens; and
    a battery operably connected to the at least one illumination strip via a switch.

2. The circumambient illumination eyewear of claim 1, wherein the at least one illumination strip emits, collectively, at least 100 lumens into the workspace.

3. The circumambient illumination eyewear of claim 1, wherein the at least one illumination strip emits, collectively, at least 500 lumens into the workspace.

4. The circumambient illumination eyewear of claim 1, wherein the battery is mounted in the bridge of the frame.

5. The circumambient illumination eyewear of claim 1, wherein the battery is mounted in the bridge of the frame adjacent the temple end.

6. The circumambient illumination eyewear of claim 1, wherein the battery is mounted in the bridge of the frame and operably connected to a dimmer switch mounted in the temple end of the bridge of the frame.

7. Circumambient illumination eyewear adapted to be worn over the eyes and nose of a user for illumination of a workspace, the circumambient illumination eyewear comprising:
    a frame sized and shaped to be mounted over the eyes of the user, the frame having a bridge which extends between temple ends across a midsection that is positioned above the user's nose;
    a means for mounting the frame over the user's eyes;
    a pair of lenses mounted on the frame such that each lens covering an eye-space that is positioned over the user's eyes when the user is wearing the eyewear, the pair of lenses each have an upper edge that is mounted to the bridge of the frame, an outer side edge that extends downwardly form the temple end, an inner side edge that extends downwardly from the midsection, the outer side edges and the inner side edges being connected by a bottom edge;
    at least one illumination strip disposed around each of the pair of lenses so that the at least one illumination strip extends entirely around each of the pair of lenses, along the upper edge, the outer side edge, the bottom edge, and the inner side edge;
    wherein the at least one illumination strip includes a means for emitting at least 50 lumens of light into the workspace; and
    a battery operably connected to the at least one illumination strip via a switch.

8. The circumambient illumination eyewear of claim 7, wherein the at least one illumination strip emits, collectively, at least 100 lumens into the workspace.

9. The circumambient illumination eyewear of claim 7, wherein the at least one illumination strip emits, collectively, at least 500 lumens into the workspace.

* * * * *